United States Patent [19]
Cerola et al.

[11] 3,941,043
[45] Mar. 2, 1976

[54] RANGE WITH REMOVABLE DEEP FAT FRYER UNIT

[75] Inventors: Joseph J. Cerola; Louis J. Jenn, both of Indianapolis, Ind.

[73] Assignee: Jenn Air Corporation, Indianapolis, Ind.

[22] Filed: Oct. 29, 1974

[21] Appl. No.: 518,357

[52] U.S. Cl. .................. 99/339; 99/403; 99/446; 219/447
[51] Int. Cl.² ............................................. A47J 27/12
[58] Field of Search ............ 99/339, 340, 403, 421, 99/422, 446, 447; 219/445, 446, 447

[56] References Cited
UNITED STATES PATENTS

| | | | |
|---|---|---|---|
| 2,785,266 | 3/1957 | Lewis et al. | 219/445 |
| 2,786,929 | 3/1957 | Michaelis | 219/445 |
| 2,817,331 | 12/1957 | Kaplan et al. | 99/339 UX |
| 3,008,406 | 11/1961 | Reeves et al. | 99/421 H X |
| 3,107,601 | 10/1963 | Longmire | 210/DIG. 8 |
| 3,525,852 | 8/1970 | Filipak | 219/445 X |
| 3,600,554 | 8/1971 | Bange | 219/447 X |
| 3,632,982 | 1/1972 | Linger | 219/447 |
| 3,797,375 | 3/1974 | Cerola | 99/340 |

*Primary Examiner*—Robert L. Bleutge
*Assistant Examiner*—Arthur O. Henderson
*Attorney, Agent, or Firm*—Woodard, Weikart, Emhardt & Naughton

[57] ABSTRACT

Disclosed is a cooking range in which an air intake plenum and a deep fat fryer cavity are formed side-by-side in a housing. The cavity accommodates a relatively deep receptacle having an electrical outlet on its sidewall and adapted to be filled with frying oil to a level below the electrical outlet. A heating element, having a terminal plug removably inserted in the electrical outlet, extends adjacent the base of the receptacle for heating the frying oil. Removal of the heating element permits other cooking units, having differing cooking functions, to be inserted in the cavity in spaced overlying relation to the pool of frying oil in the receptacle. The other cooking units may, thus, be alternately operated without necessitating removal of the frying oil from the receptacle.

5 Claims, 7 Drawing Figures

RANGE WITH REMOVABLE DEEP FAT FRYER UNIT

BACKGROUND OF THE INVENTION

A cooking range having removable cooking units, each adapted to perform a specialized cooking function and alternately insertable into the range, is disclosed in U.S. Pat. No. 3,797,375, assigned to the assignee of the present invention.

The present invention provides an improved selectively interchangeable cooking apparatus in that it can accommodate a deep fat fryer unit as one of the cooking units and permits use of alternate types of cooking units in the well or cavity of the fryer without first removing the frying oil from the fryer receptacle. The flexibility of the range in utilizing lift-out cooking units of differing, specialized cooking function is maintained, even though one of the alternate cooking units is a relatively large deepfat fryer. The arrangement is such as to further maintain the self-ventilating feature of the range. The placement of the ventilating air intake plenum directly adjoining the cavity which accommodates the deep-fat frying receptacle, with the plenum intake along one side margin of the receptacle, results in a grease droplet and odor entraining flow of ventilating air across the open top of the fryer receptacle. An optional grease shield plate may be utilized to horizontally overlie the pool of frying oil while other cooking units are in use. When extended vertically, the plate shields the adjacent wall area and may be provided with a hanger from which the conventional frying basket can be suspended in draining position.

DESCRIPTION OF THE PREFERRED EMBODIMENTS

Figure 1:
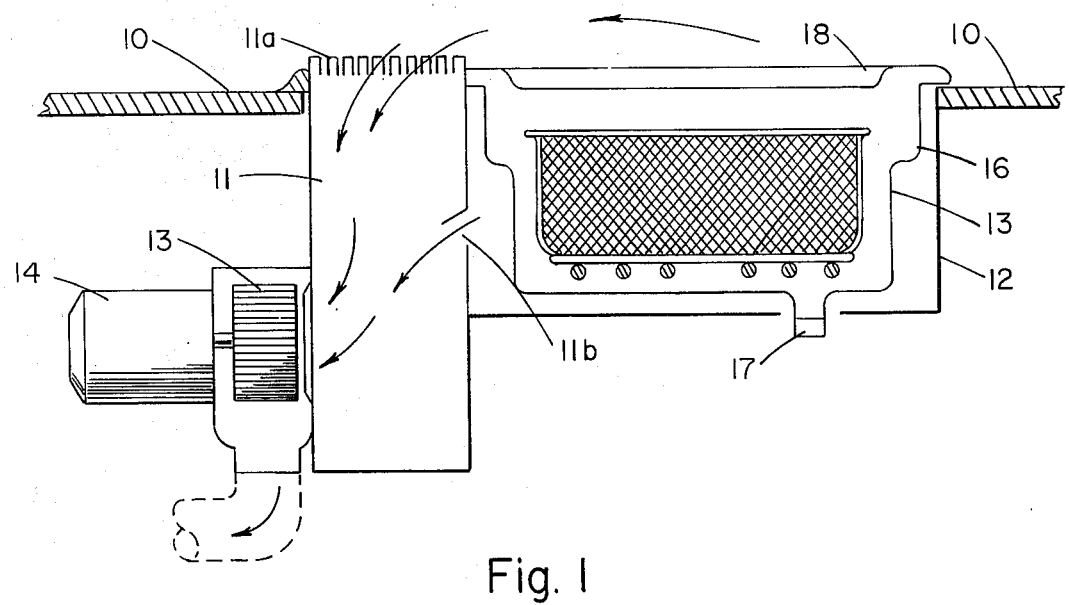
FIG. 1 is a fragmentary, schematic, sectional view of the structure of the present invention.

Referring initially to FIG. 1, a drop-in type cooking range is shown, the range being generally flush with the countertop 10. The range includes a housing which provides in side-by-side relation an air intake plenum 11 and a deep-fat fryer cavity formed by burner box 12. A centrifugal blower wheel 13, rotated by an electric motor 14 functions to maintain the interior of the plenum below atmospheric pressure. This results in ventilating air being drawn across the open top of deep-fat frying receptacle 13 which is disposed in the cavity formed by the burner box 12. The air moves as indicated by arrows in FIG. 1 through the plenum intake aperture 11a and, where opening 11b is provided in the plenum, through the space adjacent the receptacle 13. The plenum chamber may be provided with a filter (not shown) across the blower wheel inlet.

Figure 2:
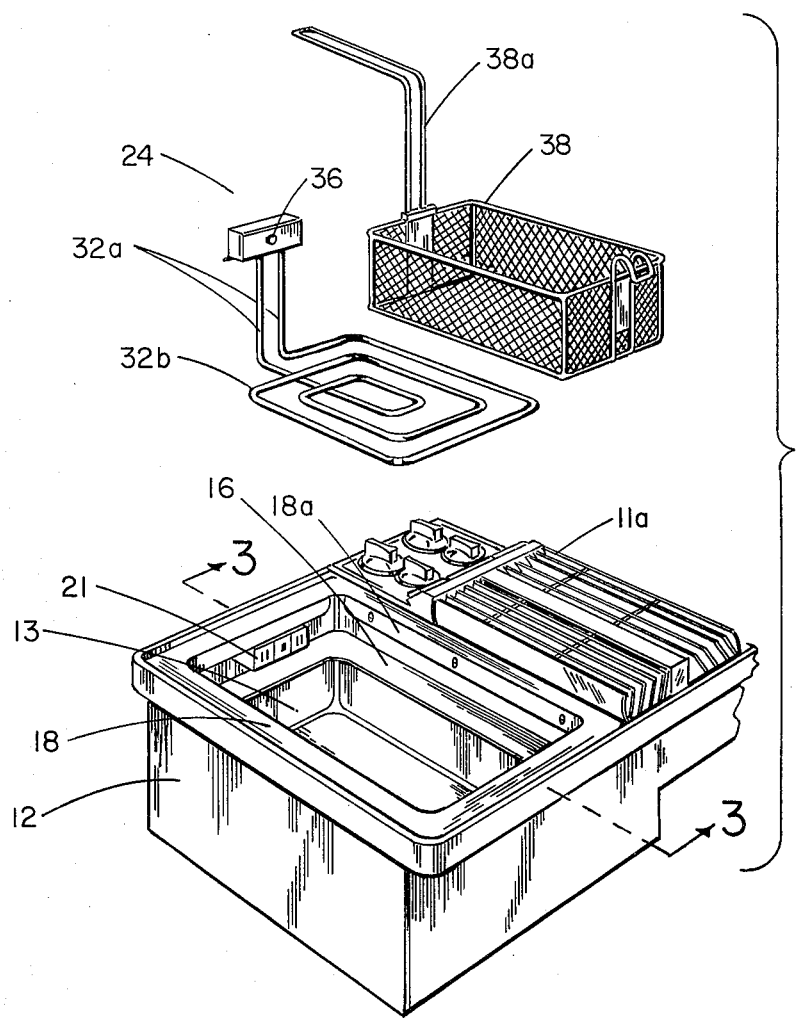
FIG. 2 is a fragmentary, exploded, perspective view of structure shown in FIG. 1.

The receptacle 13 has an internal shoulder 16 and a manual valve controlled drain fitting 17 which extends through a registering opening in the box 12. As may be seen in FIGS. 2 and 3, a framing member 18 encloses the cavity formed by box 12 and its depending lip 18a extends below, and encloses, the upper margin of receptacle 13.

Figure 7:
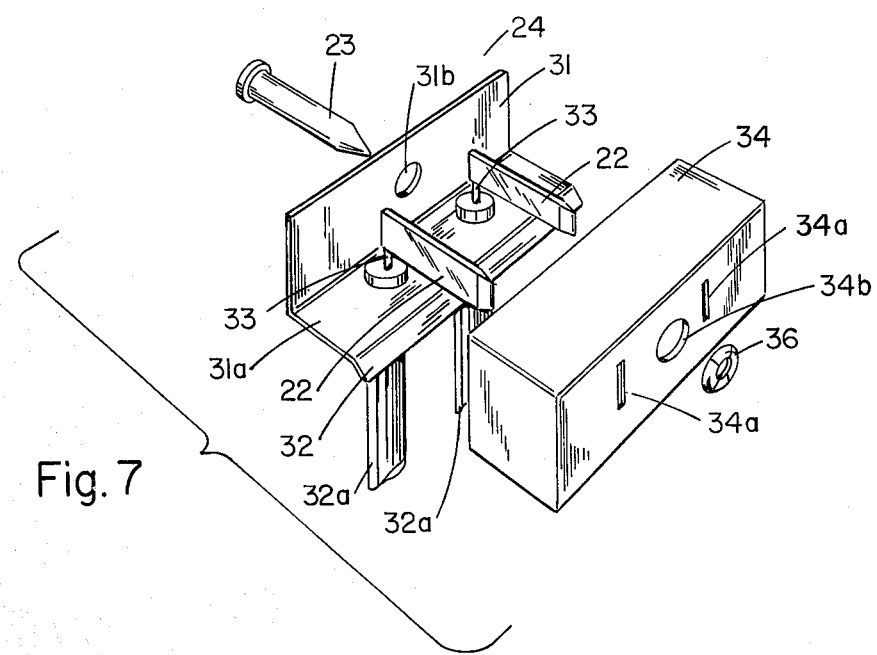
FIG. 7 is an exploded, perspective view of the electrical terminal plug utilized on the deep-fat fryer heating element.

Above the shoulder 16 and adjacent its upper margin, the receptacle 13 carries an electrical terminal plug 21 which receives the contact spades 22 and ground prong 23 (FIG. 7) of the electrical terminal plug 24 which is shown in detail in FIG. 7. As may be seen in FIG. 7, the plug 24 includes a metal plate 31 of generally L-shaped cross-section and having an angularly depending lip 32 along the side margin of the plate leg portion 31a. The plate portion 31a is provided with spaced apertures to which the outer metal sheath of the adjacent ends 32a of a conventional, metal sheathed-type electrical resistance heating element 32 are rigidly connected in an electrically conductive junction. The extending, internal resistance wire ends 33 are electrically connected to the contact spades 22. A ceramic block 34 accommodated within the bight of the L-shaped plate 31 has parallel apertures 34a through which the contact spades 22 extend, and the ground pin 23 extends through an aperture 34b in the block and a registering aperture 31b in the plate 31 and receives a retainer 36 to clamp the block to the plate, the ground pin having electrical connection to the plate 31. The heating unit 32 extends from the plug assembly in a closed loop and is shaped to provide a sinuous portion 32b lying substantially in single horizontal plane offset or spaced downwardly from the plug 24 as may best be seen in FIG. 2.

A removable, fryer basket 38, conventionally formed and having an integral handle portion 38a, is accommodated within the receptacle 13 and rests upon the lower portion 32b of the heating element. The receptacle is adapted to be filled with frying oil or grease to a level below the shoulder 1b.

Figure 3:
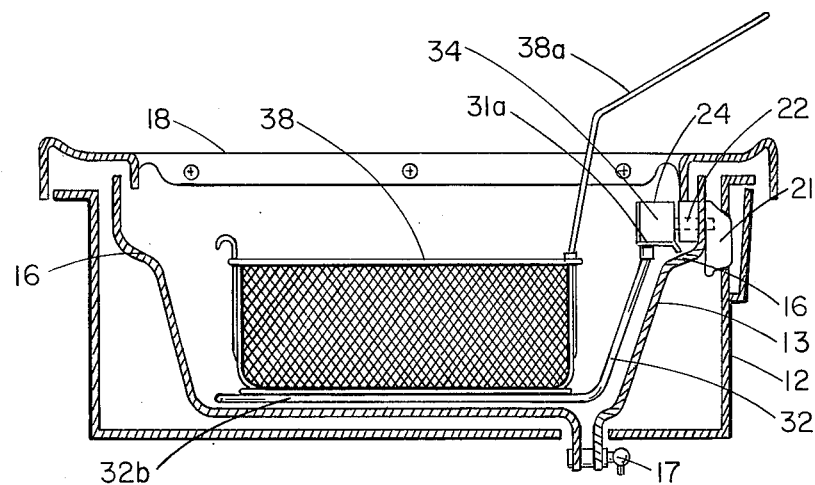
FIG. 3 is an enlarged, side sectional view of the deep-fat fryer component with the heating element in place.
Figure 4:
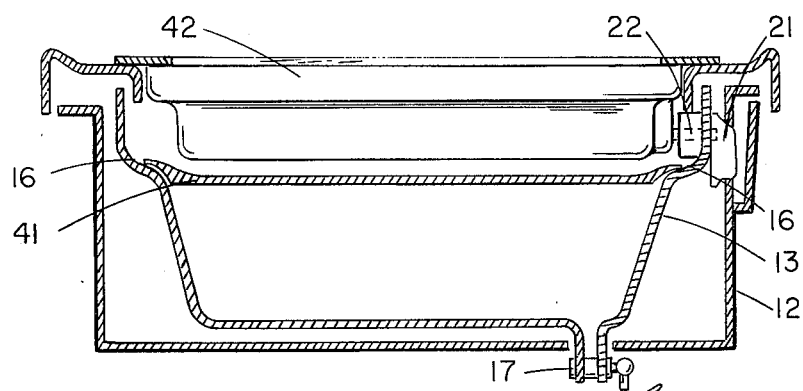
FIG. 4 is a view similar to FIG. 3 but with an alternate form of cooking unit in place over the fryer receptacle from which the heating element has been removed.

As will be evident from a comparison of FIGS. 3 and 4, with basket 38 and heating element 32 removed from receptacle 13, an optional grease shield plate 41 may be placed in the receptacle overlying the area just below the shoulder 16 on which the plate may rest. A cooking top, cartridge type unit, such as the glasscovered cartridge type assembly 42 may then be placed in the upper portion of the receptacle and plugged into the outlet member 21. The cartridge assembly 42 may be of the type disclosed in U.S. Pat. No. 3,797,375 and, it will be understood, other types of cooking units could be inserted in place of unit 42, such as an exposed heating element cartridge or a grill or a rotisserie, all disclosed in the aforementioned U.S. Pat. No. 3,797,375. Cooking units such as shown in FIG. 4 may be utilized without requiring the frying oil first be drained from receptacle 13.

Figure 6:
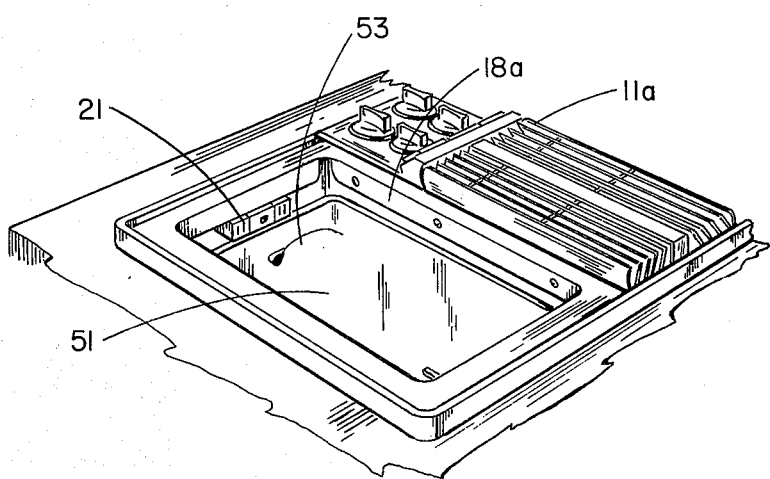
FIG. 6 is a fragmentary, perspective view of the structure shown in FIG. 5 but with the grease shield plate in lowered position.
Figure 5:
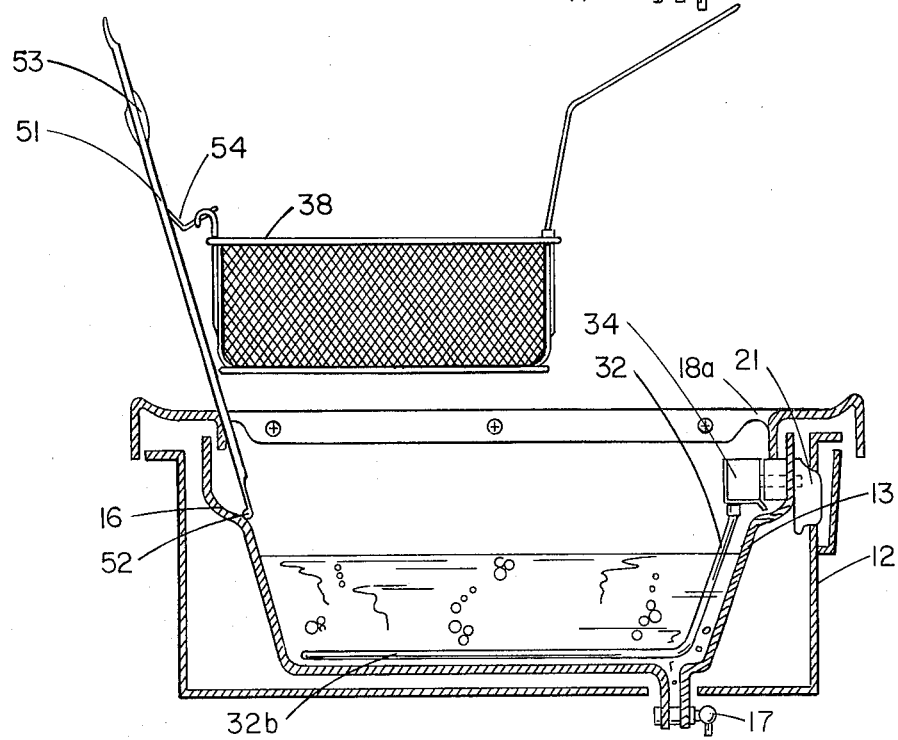
FIG. 5 is a view similar to FIG. 4 but showing a modified form of the apparatus.

In FIGS. 5 and 6 a modified form of the assembly is shown which differs from that previously described primarily in that a grease-shield plate 51 is provided which is pivotally attached at 52 to the receptacle. The plate 51 is provided with a handgrip depression 53 and is shown in raised or upright position in FIG. 5 and in lowered or closed position in FIG. 6. As will be evident from FIG. 5, the underface of plate 51 is provided with a hanger element 54 which is adapted to support fryer basket 38 in draining position over the receptacle 13 when draining of the basket is desired.

The structure described provides a deep fat fryer apparatus which does not extend appreciably above the countertop level. The well utilized to accommodate the frying oil can be drained after use, or, by using the overlying grease-shield plate, and with the frying oil heater removed, other cooking operations, using alternate cooking units, can be carried on without draining the fryer well or receptacle.

We claim:

1. A cooking range adapted to alternately accommodate differing electrical cooking units at its countertop cooking surface comprising a housing providing in side-by-side relation an air intake plenum and a deep-fat fryer cavity, said intake plenum opening along one side margin of said cavity and adapted to draw in cooking fumes from said fryer cavity when the plenum pressure is below atmospheric, said fryer cavity being formed by an opened-topped relatively deep receptacle extending downwardly from the cooking surface into the fryer cavity formed by the housing, the base of said receptacle being provided with a drain aperture and an electrical outlet on the receptacle side wall adjacent its upper margin, a heating element having an offset terminal plug and a sinuous portion formed in a plane spaced from the electrical terminal plug, said terminal plug being adapted to be inserted in said electrical outlet and the said sinuous portion of the heating element being thereby disposed closely adjacent to the base of said receptacle, and a removable fryer basket received within said receptacle, whereby with frying oil filling said receptacle to a level below said electrical outlet, deep fat fry cooking may be accomplished, and with said heating element removed from the receptacle, other cooking units having differing cooking functions may be installed to overlie said receptacle without necessitating removal of the frying oil therefrom.

2. A cooking range as claimed in claim 1 in which said receptacle is provided with abutments extending inwardly from its side walls and adjacent to its upper margin but below said electrical outlet carried by the receptacle, and a grease-shielding plate adapted to rest on said abutments after removal of said heating element to thereby separate the pool of frying oil in said receptacle from the underside of said other cooking units installed in overlying relation to said receptacle.

3. A cooking range as claimed in claim 2 in which said abutments take the form of an internal shoulder extending around the receptacle side walls and disposed just below said electrical outlet.

4. A cooking range as claimed in claim 2 in which said plate is pivotally attached along one of its margins to said receptacle, and thereby adapted to be pivotally moved to an upright position when said heating element is in place during deep fat fry cooking operation of the range.

5. A cooking range as claimed in claim 4 in which said plate is provided with a hanger on its underface adapted to support said fryer basket in a draining position above said receptacle when said shield plate is in upright position.

* * * * *